United States Patent [19]

Tukamoto

[11] Patent Number: 4,519,555
[45] Date of Patent: May 28, 1985

[54] WEBBING LOCKING DEVICE FOR THE SEAT BELT OF AN AUTOMOTIVE VEHICLE

[75] Inventor: Masahiro Tukamoto, Fujisawa, Japan

[73] Assignee: Nippon Seiko Kabushiki Kaisha, Tokyo, Japan

[21] Appl. No.: 374,778

[22] Filed: May 4, 1982

[30] Foreign Application Priority Data

May 7, 1981 [JP] Japan ................................. 56-69192

[51] Int. Cl.³ ...................... A62B 35/02; B65H 75/48
[52] U.S. Cl. ......................... 242/107.2; 242/107.4 A
[58] Field of Search .............. 242/107.2, 107.4 A; 280/806, 807, 808; 297/478, 479, 480

[56] References Cited

U.S. PATENT DOCUMENTS

| 3,817,473 | 6/1974 | Board et al. | 242/107.2 |
| 4,128,261 | 12/1978 | Paitula | 280/806 X |
| 4,249,708 | 2/1981 | Asano | 242/107.2 |
| 4,327,881 | 5/1982 | Fohl | 242/107.2 |
| 4,371,127 | 2/1983 | Shimogawa et al. | 242/107.2 |
| 4,378,915 | 4/1983 | Fohl | 242/107.2 |
| 4,378,916 | 4/1983 | Keinberger | 242/107.2 |
| 4,383,659 | 5/1983 | Okabe | 242/107.2 |
| 4,403,751 | 9/1983 | Asano | 242/107.2 |
| 4,438,551 | 3/1984 | Imai | 242/107.4 A X |

Primary Examiner—John M. Jillions
Attorney, Agent, or Firm—Wyatt, Gerber Shoup, Scobey and Badie

[57] ABSTRACT

A webbing locking device for the seat belt of an automotive vehicle comprises a retractor base, a speed change detector, a webbing take-up reel, a brake for the reel, a rotor for winding the webbing, and rotor arms supporting the rotor for relative movement and mounted so as to be pivotable relative to the retractor base. The outer peripheral surface of the rotor is formed with rotor latch teeth, and the upper end of the rotor arms is formed into a brake for meshing with the rotor latch teeth.

8 Claims, 3 Drawing Figures

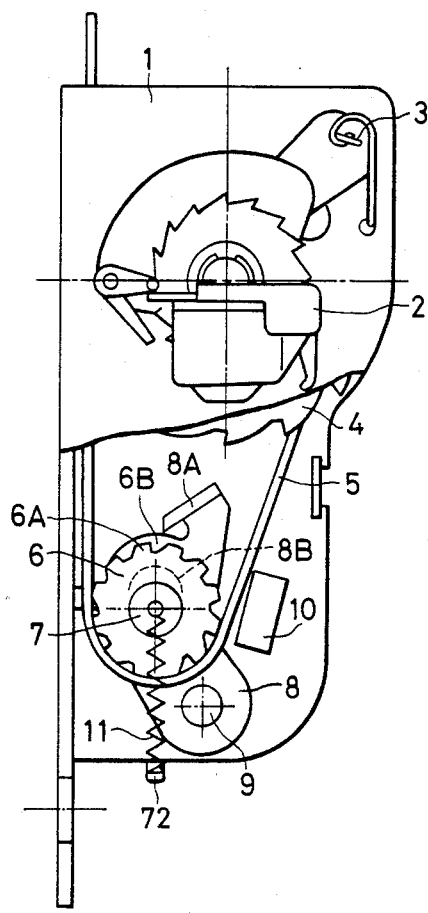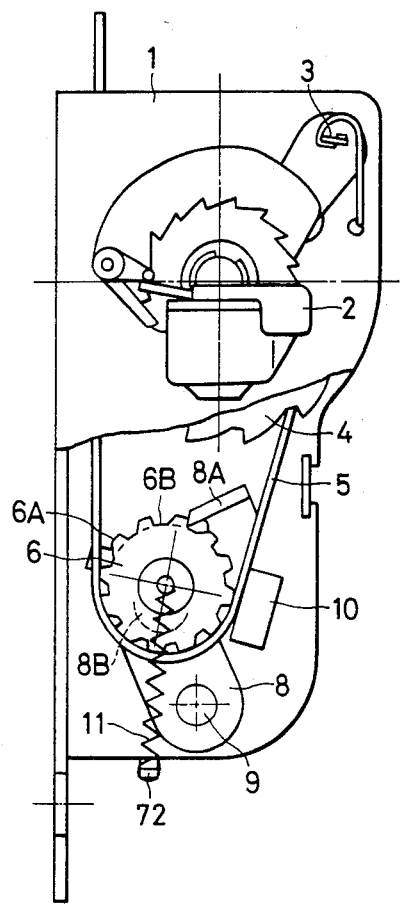

WEBBING LOCKING DEVICE FOR THE SEAT BELT OF AN AUTOMOTIVE VEHICLE

BACKGROUND OF THE INVENTION

1. Field of the Invention

This invention relates to a locking device requiring a reduced number of parts for locking the webbing of a seat belt of an automotive vehicle.

2. Description of the Prior Art

It has been commonly practised to withdraw the webbing of a seat belt from a retractor and place it across the body of a seat occupant during driving, and typically design is such that when the seat occupant moves his body, the webbing can be further withdrawn from a take-up reel of the retractor or rewound in accordance therewith so that the seat occupant is not subjected to a strong sense of oppression. However, when a sudden impact, acceleration or deceleration is exerted on the vehicle body and a strong force is suddenly applied to the seat occupant, the withdrawal of the webbing from the retractor must be stopped to prevent the seat occupant from being thrown forwardly.

SUMMARY OF THE INVENTION

The present invention intends to improve a locking device having fixing means for preventing rotation of the take-up reel by a sensor adapted to sense a sudden impact, acceleration or deceleration and then preventing the webbing from being further withdrawn by the webbing being strongly pulled and the reel being tightened, and to reduce the number of parts used in such locking device. That is, in the present invention, a brake for locking a rotor and rotor arms for supporting the rotor are made integral with each other and the outer periphery of the rotor itself is formed with teeth so that the rotor and friction engaging means may be formed integral with each other, thereby reducing the number of parts.

The invention will become fully apparent from the following detailed description thereof taken in conjunction with the accompanying drawings.

BRIEF DESCRIPTION OF THE DRAWINGS

FIG. 1 is a side view showing the non-operative position of a locking device of the present invention.

FIG. 2 is a side view showing the locking position of the same locking device.

DESCRIPTION OF THE PREFERRED EMBODIMENT

Figure 3:
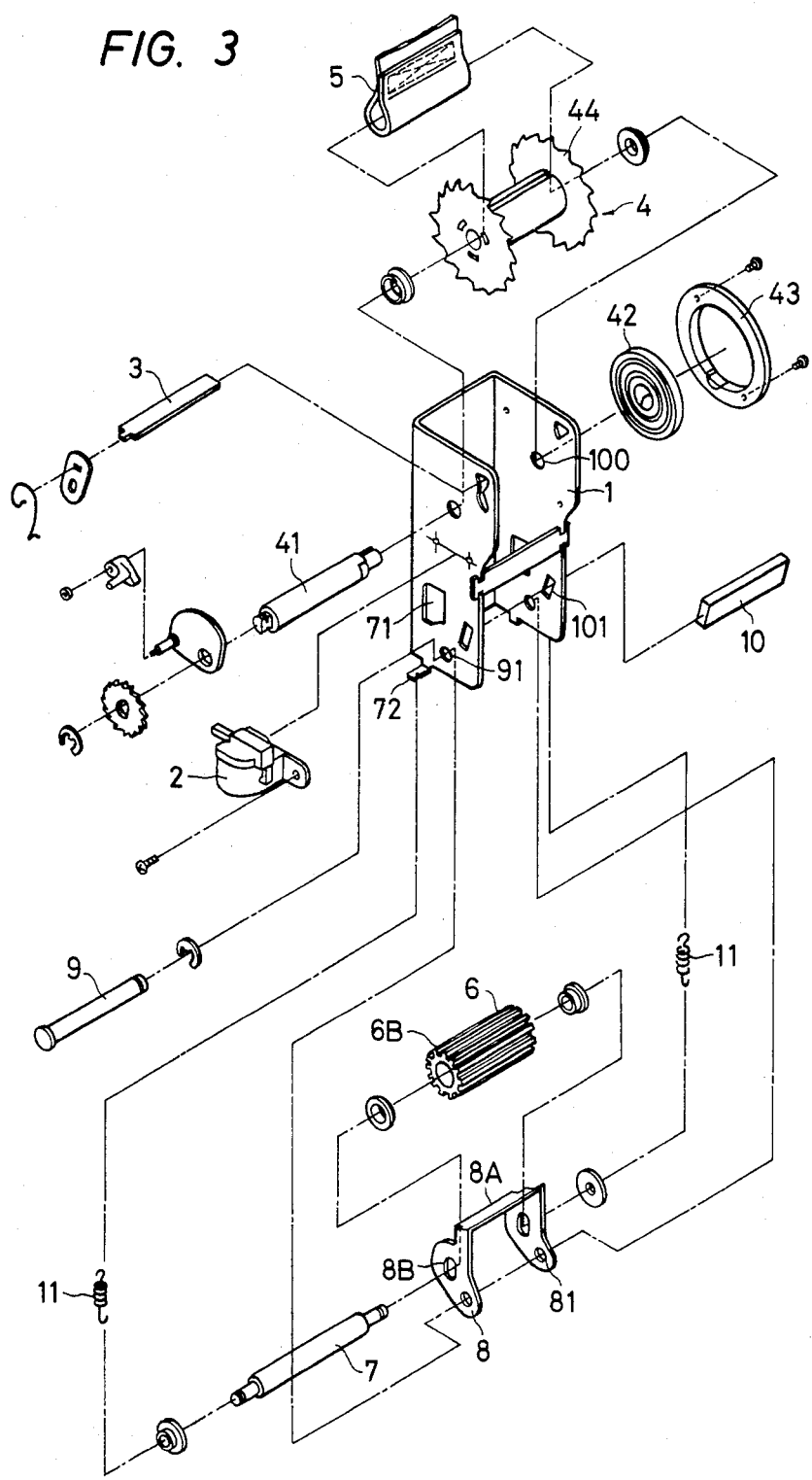
FIG. 3 is an exploded perspective view of the locking device in which the parts are disassembled.

FIG. 1 is a side view showing a portion of a rotor with a retractor base partly cut away to show the non-locking position of the locking device of the present invention, FIG. 2 is a side view showing a portion of the rotor with the retractor base partly cut away to show the locking position of the locking device of the present invention, and FIG. 3 is an exploded perspective view illustrating the coupled relations between the parts of the device of the present invention. Referring to these Figures, a retractor base 1 has a speed-change sensor 2 attached thereto. This sensor is equipped with a pendulum or the like and operates by inertia of the vehicle body and is of a well-known construction, as described in U.S. Pat. No. 4,083,511 granted to H. Ikesue, for example.

A take-up reel 4 is mounted on the retractor base by means of a reel shaft 41 extending through holes 100 formed on the base 1. Webbing 5 is wound on the reel 4. The reel shaft 41 is normally biased in a direction to take up the webbing (counter-clockwise direction as viewed in Figures) by a take-up coil spring 42. Designated by 43 is a cover for the spring 42. The retractor base 1 is further provided with a locking member which is operatively associated with the speed change sensor 2 in the manner as taught in the U.S. Pat. No. 4,083,511, and this locking member is brought into mesh with the left and right latch gears 44 of the take-up reel 4 when the sensor 2 experiences a sudden change in acceleration. Below the retractor base, a rotor 6 has the webbing 5 wound pivotally therearound for guiding the webbing, and is mounted rotatably on arms 8 in such a manner that the rotor 6 may slide transversely relative the latter by means of a shaft 7 extending through slots 8B in the arms 8. The arms 8 are pivotably mounted on the retractor base by means of a rotor arm shaft 9 extending through holes 81 in the rotor arms and holes 91 in the retractor base. The rotor shaft 7 is biased downwardly within the slots 8B by a spring 11 secured to a projection 72 in the lower portion of the retractor base. A stator 10 to be engaged with the rotor 6 is mounted in holes 101 formed on the base 1. The upper ends of the rotor arms 8 are formed into a locking portion 8A for meshing with the latch teeth 6B formed on the outer periphery of the rotor. When the locking portion 8A is brought into engagement with the latch teeth 6B of the rotor, rotation of the rotor is stopped.

Operation of the device will now be described. In FIG. 1, during the normal operative condition, the webbing 5 withdrawn from the take-up reel 4 is outwardly drawn around the rotor 6. Now, when an impact, a sudden acceleration or deceleration has been exerted on the vehicle body, the speed change detector 2 acts to mesh the locking member 3 with the latch gears 44 of the reel to prevent the rotation of the take-up reel 4 in the direction for further withdrawal of the webbing 5 (clockwise direction as viewed in the Figures). However, a force tending to move the seat occupant forwardly due to inertia is acting on the seat occupant and, therefore, tension is created in the webbing restraining the seat occupant. Next, when a tension exceeding a predetermined value is exerted on the webbing, the rotor 6 moves upwardly in the slots 8B against the force of the spring 11 and the brake 8A of the rotor arms meshes with the latch teeth 6B formed on the outer peripheral surface 6A of the rotor, whereby rotation of the rotor 6 is prevented.

If the webbing is strongly pulled and tends to extend further, the entire rotor arms 8 are moved clockwisely about the rotor arm shaft 9 due to the tension of the webbing and the friction force between the webbing and the surface of the rotor, so that the webbing 5 becomes pinched between the outer peripheral surface 6A of the rotor and the stator 10 as shown in FIG. 2, whereby any more withdrawal of the webbing by, for example, tightening about the reel 4 is completely prevented.

The webbing locking device of the present invention is of the above-described construction which requires a reduced number of parts, which in turn leads to the provision of a locking device which is simple in construction and yet reliable in operation.

I claim:

1. A webbing device for the seat belt of a vehicle, comprising a retractor mounted on a base for receiving the webbing of the seat belt and including a webbing take-up reel, a speed change detector associated with said base, means including a brake responsive to said speed change detector for holding the reel upon a sudden change in the movement of the vehicle, a rotor having an outer peripheral surface for receiving the webbing partially therearound, rotor arms for supporting said rotor, means on said arms for supporting said rotor for movement relative said arms, means mounting said arms pivotally relative said base, and means including longitudinal latch teeth extending axially around said outer peripheral surface of said rotor and adapted to mesh with portions of said arms extending parallel thereto upon tension being created in said webbing during holding of the reel for preventing rotation of said rotor.

2. A device for a seat belt having a webbing wound around a take-up reel of a retractor mounted on a base secured to a vehicle, said webbing being adapted to be withdrawn from said retractor when placed about an occupant of the vehicle, and means for preventing rotation of said reel during a sudden change in the movement of the vehicle, the device including:

a rotor adapted to have a webbing of said seat belt wound partially around its peripheral surface as it is withdrawn from said reel, said rotor being formed with a plurality of longitudinal latch teeth extending axially around said peripheral surface, support means mounted on said base for supporting said rotor for movement rotationally about its axis and translationally normal thereto from a normal position to a second position, and means carried by said support means for engaging the latch teeth formed around said peripheral surface of said rotor when it is moved to said second position so that upon a sudden change in the movement of said vehicle, further tension in said webbing will move said rotor into engagement with said engaging means to lock said rotor against further rotation.

3. A device according to claim 2, said support means including arms holding respective end portions of said rotor and said engaging means being formed unitarily with said arms.

4. A device according to claim 3, further including a brake fixed to said base at a position adjacent said rotor with the webbing wound therearound being between said rotor and said brake, and means mounting said support means pivotally to said base so that said rotor may be pivoted toward said brake to hold said webbing tightly therebetween upon further tension being applied to said webbing during a sudden change in the movement of the vehicle.

5. A device according to claim 2, further including a brake fixed to said base at a position adjacent said rotor with the webbing wound therearound being between said rotor and said brake, and means mounting said support means pivotally to said base so that said rotor may be pivoted toward said brake to hold said webbing tightly therebetween upon further tension being applied to said webbing during a sudden change in the movement of the vehicle.

6. A device for preventing drawing-out of a webbing by tightening around a reel of a retractor, comprising a base supporting said reel rotatably, means for biasing the reel in a direction to wind up the webbing therearound, means for sensing an emergency condition of a vehicle, and reel locking means for preventing said reel from rotating in a direction to unwind the webbing therefrom, wherein said device comprises a rotor spaced from said reel and adapted to have the webbing wound at least partially around the outer peripheral surface thereof, said rotor having longitudinal latch teeth extending axially around said outer peripheral surface, said rotor being movable from a first position in which the rotor can rotate freely to a second position upon tension being created in said webbing in an emergency condition, a spring biasing said rotor towards the first position, an arm having a portion which extends parallel and opposed to said latch teeth and which meshes with one of said latch teeth when said rotor reaches the second position for preventing rotation of said rotor.

7. The device according to claim 6, wherein said rotor is mounted on said arm rotatably and slidably between the first and the second positions.

8. The device according to claim 7, wherein said arm is mounted on said base so that said portion of said arm is pivotally swung on further tension being created in said webbing after meshing said rotor at the second position, and further comprising a stator fixed on said base to clamp the webbing together with said rotor when the arm is swung.

* * * * *